Sept. 14, 1954 R. C. LINDBERG 2,689,117
CUTTER HEAD FOR MINING MACHINES
Filed April 18, 1950 2 Sheets-Sheet 2

INVENTOR.
Richard C. Lindberg
BY
Clarence F. Poole
ATTORNEY

Patented Sept. 14, 1954

2,689,117

UNITED STATES PATENT OFFICE 2,689,117

CUTTER HEAD FOR MINING MACHINES

Richard C. Lindberg, Chicago, Ill., assignor to Goodman Manufacturing Company, Chicago, Ill., a corporation of Illinois Application April 18, 1950, Serial No. 156,607

2 Claims. (Cl. 262—9)

This invention relates to improvements in machines for removing coal from the vein or seam without blasting, and has particular reference to improvements in a cutting head for a continuous type miner.

The modern continuous type cutting and loading machine has generally been characterized by a plurality of moving cutting chains which move in paths lying adjacent each other and around a frame which is movable with respect to the working face of the seam. The action of the cutting chains is such that an inordinate amount of extremely fine material is produced, and although a satisfactory amount of tonnage may be obtained, yet the percentage of lump coal of greater commercial value obtained is not as great as would be desirable.

With the foregoing considerations in mind it is a principal object of this invention to enable coal to be cut from the vein or seam by a continuous machine and to obtain a maximum amount of lump coal by the operation thereof.

Another object of the invention comprehends the provision in a continuous mining machine of a rotating cutting head having cutting bits mounted thereon to cut a plurality of cores and providing core breakers which move intervally and radially with respect to the axis of rotation of the cutting head to break off the cores left between the kerfs or grooves which are cut by the cutting bits.

Still another object is to provide a rotating cutting head having a number of moving breakers for breaking down the cores left by the action of the cutting bits, and to utilize the rotative movement of the cutting head for moving the breaker members into contact with the sides of the cores as they are built up by the action of the cutter bits to cause the cores to be broken off, and to use the same rotative movement to move the breakers radially inwardly until the cores have an opportunity to build up by the continued action of the cutting bits, and to cause the breakers to move outwardly again to break off the built up cores.

Other objects and important features of the invention will be apparent from a study of the following description taken together with the drawings which illustrate a preferred embodiment of the invention, and what is now considered to be the best mode of applying the principles thereof. The scope of the invention, however, it not intended to be limited by the embodiment shown, nor otherwise than by the scope and spirit of the appended claims.

In the drawings:

Fig. 3 is an enlarged detail view of one of the breakers shown in Figs. 1 and 2; and Fig. 4 is an end view of the breaker shown in Fig. 3 looking in the direction of the arrows 4—4 of Fig. 3.

Figure 1:
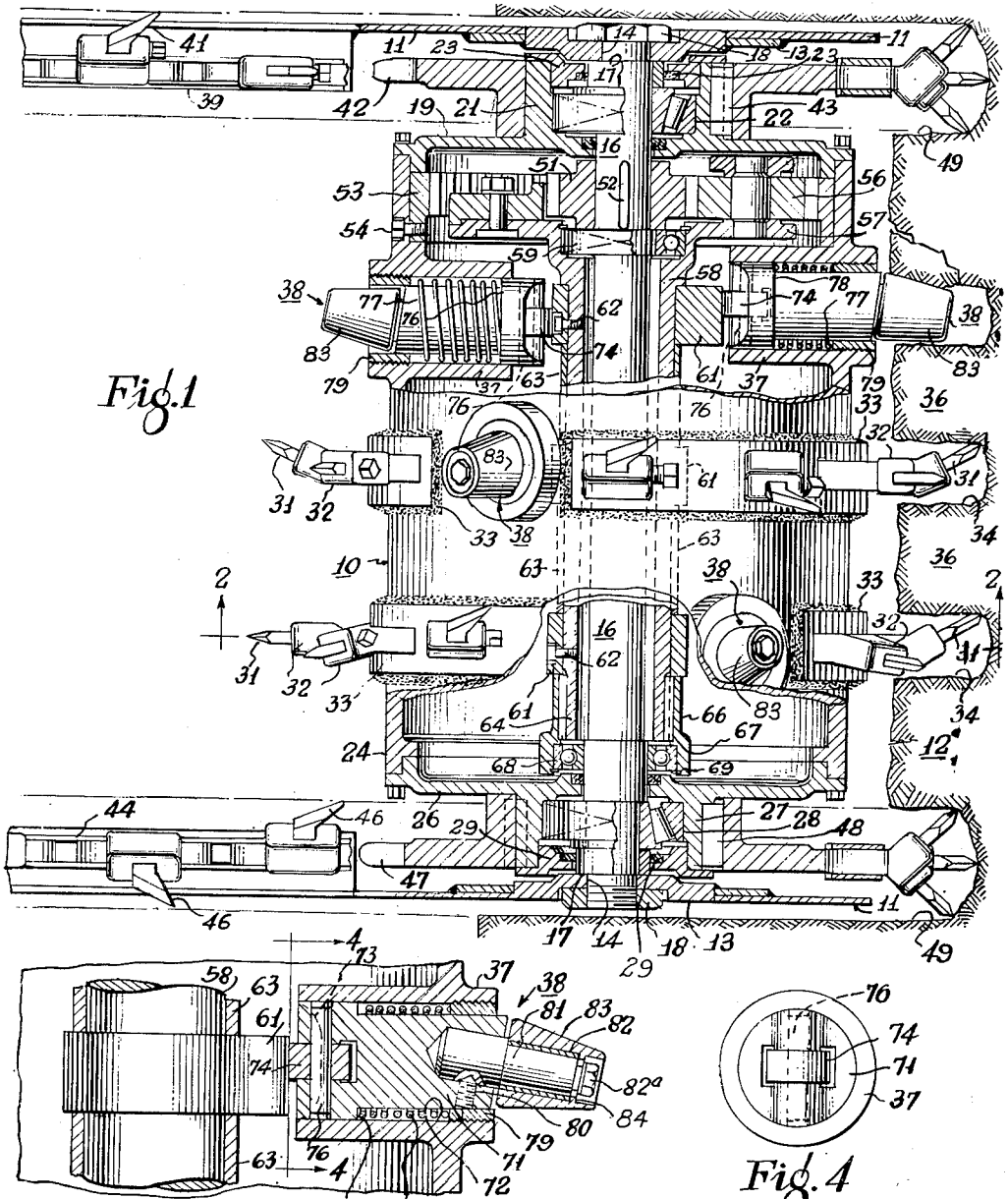
Fig. 1 is a plan view of a rotating drum cutter for a continuous mining machine, certain parts thereof being shown in longitudinal section.

Referring now to the drawings, the present invention is shown as embodied in a rotary cutting head 10 for a continuous mining machine. The rotary cutting head 10 is supported for rotation on a pair of spaced frames 11 which are movable with respect to a coal seam 12 by mechanism, not shown, of a combined cutting and loading machine of the type disclosed in Cartlidge application, Serial No. 116,684, filed September 20, 1949, the Cartlidge application and this application having a common assignee. A gudgeon plate 13 is welded to each frame 11 and is bored at 14 to receive a stationary shaft 16 extending across the spaced frames 11. The shaft 16 has a shoulder 17 at each end which bears against the inner face of the gudgeon plates 13, and a nut 18 is threaded to each end of the shaft 16 to bear against the outer face of the gudgeon plates 13, and thus hold the shaft 16 in position on the frames 11.

The rotary cutting head 10 is mounted for rotation on the stationary shaft 16 and includes an end bell 19 having a flange 21 supported on a bearing 22 held on the stationary shaft 16. The end bell 19 is bolted to one end of a cylindrical shell 24, which is bolted at its other end to an end bell 26 having a flange 27 supported on a bearing 28 held on the shaft 16. An oil seal 23 lies between the bearing 22 and the gudgeon plate 13, and a similar oil seal 29 lies between the bearing 28 and the gudgeon plate 13.

The cylindrical shell 24 provides a support for cutter bits 31 mounted in bit holders 32 which are formed as parts of an arcuate pad segment 33 welded to the cylindrical surface of the shell 24. As shown, the bits 31 are staggered and are located in spaced tiers throughout the length of the cylindrical shell 24 so that upon rotative movement of the cutter drum 10, a plurality of kerfs 34, spaced by cores 36, are cut into the seam 12.

Referring now also to Fig. 3, the arcuate pad segments 33 in each tier alternate with a cylindrical flange 37 which extends radially inward from the surface of the cylindrical shell 24 and which also extends a short distance radially outward from the surface of the cylindrical shell 24. The flange 37 defines a support for radially movable breakers indicated generally at 38, which are so disposed with reference to the kerfs 34 that upon conditions as will be described later the breakers 38 will move outwardly to break the cores 36 left between the kerfs 34.

The rotary cutter 10 is adapted to be driven by a chain 39 having staggered cutters 41 mounted at intervals throughout the length thereof. The chain 39 drives a chain sprocket 42 which is keyed at 43 to the flange 21 of the end bell 19. The rotary cutter 10 is likewise also driven by a similar cutter chain 44 having staggered cutters 46 mounted at intervals throughout the length thereof. The chain 44 drives a similar sprocket 47 keyed at 48 to the flange 27 of the end bell 26. The staggered cutters 41 and 44 thus cut kerfs 49 of such a dimension as to clear the side frame members 11, so that the cutting head 10 may advance with the frame members 11 into the seam of coal in accordance with the rate of feed movement of the continuous miner.

Means are provided for imparting radial movement to the breakers 38 and to cause them to move outward radially when the cores 36 between the kerfs 34 have built up as the cutting head 10 advances with the frames 11 into the coal seam. The breaker members 38 are preferably moved outwardly after a certain number of revolutions of the cutting head 10 have taken place, and it is preferable also that the movement outward and then inward is accomplished with a minimum amount of time so that the breakers 38 will be in contact with the core 36 only long enough to cause breaking thereof. By causing the breakers 38 to operate only when a sufficient depth of core has been built up by the operation of the cutter bits 31 it is possible to obtain larger coal fragments than are possible by the action of the cutter bits alone. In order to move the breakers 38 outwardly, the rotation of the drum cutter 10 is employed to drive a cam-shaft to move the breakers 38 radially against the cores 36. The radial movement of the breakers 38 is accomplished by a sun gear 51 keyed at 52 to the shaft 16 and meshing with planet gears 56 mounted on a spider 57, which in turn mesh with an internal ring gear 53 held in position to the cylindrical shell 24 by socket head screws 54. The sun gear 51, the internal ring gear 53 and the planet gears 56 are so chosen preferably that the spider 57 will make nineteen revolutions for each twenty revolutions of the cutter head 10. Depending upon the frequency with which the breakers 38 are desired to move outward, the arrangement of the planetary train thus far described may be modified as desired.

The spider 57 is integral with a hollow cam shaft 58 and is supported on the end thereof adjacent the sun gear 51 on a bearing 59. The cam shaft 58 provides a support for a plurality of cams 61 each of which operate a pair of breakers 38 associated with its respective tier of cutter bits 31. Each cam 61 is fastened to the cam shaft 58 by socket head screws 62 which are threaded into the cam shaft 58. Each cam 61 is spaced from the cam cooperating with the cam associated with the next adjacent pair of breakers 38 by spacing collars 63 surrounding the hollow cam shaft 58.

The cam shaft 58 is externally splined at 64 at the end thereof remote from the spider 57 with an internally splined sleeve 66 having a bell 67 at the end thereof remote from the next adjacent cam 61 to hold a bearing 68 supported on the stationary shaft 16. As shown in Fig. 1, the end of the hollow cam shaft 58 remote from the planetary train abuts a keeper ring 69 which bears against the bearing 68.

Referring now to Fig. 3, each breaker 38 includes a cam follower 71 which is movable within a bore 72 formed in the flange 37. The interior end of the cam follower 71 is chamfered as at 73 to provide clearance for a cam follower roller 74 in following the contour of the cam 61. Said cam follower roller is journaled on a pin 76 in the cam follower 71. The cam follower 71 is encircled by a spring 77 which abuts a shoulder 78 on the cam follower 71 and which also abuts a retainer ring 79 threaded into the flange 37 and encircling the cam follower 71. The spring 77 is loaded so that it maintains the cam follower roller 74 in contact with the cam 61 at all times. The cam follower 71 is provided with a journal pin 81, the axis of which is inclined with respect to an imaginary axis lying on a radius of the cylindrical shell 24, and also lying in a plane passing through the center of rotation of the cylindrical shell 24. The journal pin 81 is held to the follower 71 by a set screw 80 tapped into the side of the follower 71, and is provided with a bushing 82 for a tapered roller 83 which is held against endwise movement by an inturned flange 84 and a bolt 82a threaded into the journal pin 81. The roller 82 is tapered so that a surface element thereof coincides with a surface element of the cam follower 71, and so that the cam follower 71 together with the tapered roller 83 can move radially past the retaining ring 79 and within the bore 72 according to the position of the cam 61.

As shown with respect to Fig. 1, a surface element of the tapered roller 83 is parallel to a side wall of the kerf 34 and is adapted to move upon outward movement of the cam follower 71 into the kerf 34 and in such a fashion that a diametrically opposite surface element of tapered roller 83 will contact the corner of the core 36 and fragment the coal thereat.

As seen also with respect to Fig. 1, the tapered roller 83 of each breaker 38 is journaled on a pin 81 which is inclined oppositely from the journal pin 81 on the opposite breaker 38, so that the tapered roller 83 will fragment the core from the core 36 on each side of the kerf 34. Each cam follower is staggered with respect to its opposite cam follower so that its accompanying tapered roller 83 can enter the kerf 34 and break opposite corners of the cores 36.

Figure 2:
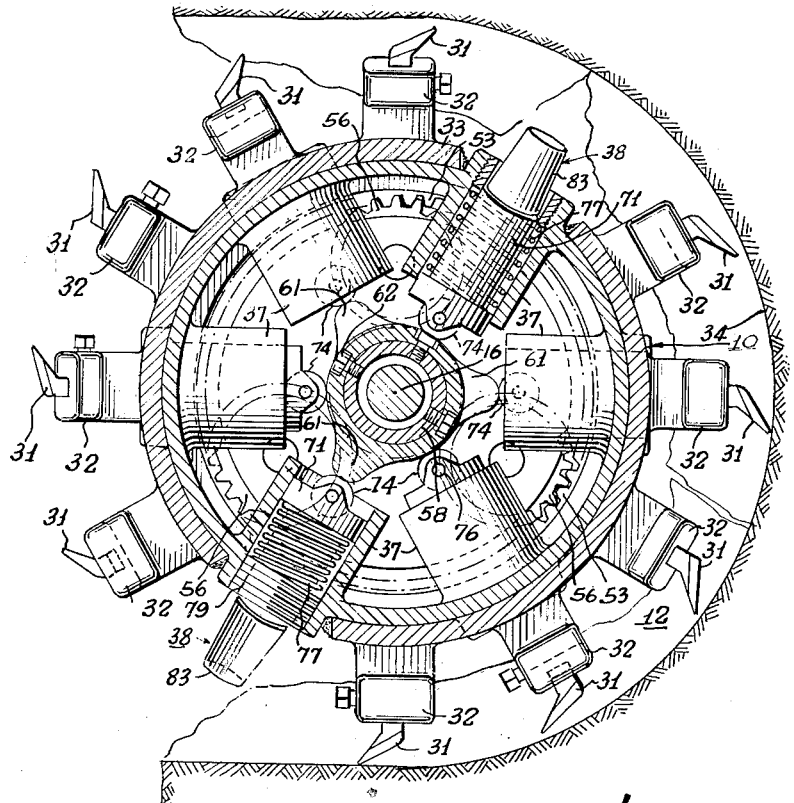
Fig. 2 is a transverse section taken along the line 2—2 of Fig. 1 showing the mechanism for moving the core breakers, and the manner in which the lifting cams for moving the core breakers are arranged on the cam shaft.

The cams 61 are preferably displaced angularly with respect to each other so that the breakers 38 will move sequentially outward to reduce the amount of power necessary to fragment coal from the cores 36 as the cutter head 10 revolves. As seen in Fig. 1, there are three tiers or sets of breakers 38, each tier having an oppositely disposed pair of breakers. As seen in Fig. 2, the cams 61 are spaced 120° apart so that only one of the breakers is in contact with a core 36 at any one time. The contour of each cam is no part of the present invention except as it is desirable for each cam to have a rapid lift and fall so that the breakers 38 will move out rapidly to break the cores 36 and then move back while the cutting action of the cutters 31 may continue until the breakers 38 again move outward.

The cutters 31 are so designed that they lie on a circle having a greater radius than the radius of the end of the breaker 38 when moved outward fully by the action of the cams 61. This construction is desirable to afford clearance at all times for the end of the breakers 38 irrespective of whether the cutter bits 31 have cut a kerf sufficiently deep to define a core 36 to be broken off by the tapered rollers 83 of the breakers 38.

In operation, the cutters 31 mounted on the cylindrical shell 24 cut the kerfs 34 which alternate with the cores 36. The rotation of the drum 24 together with the internal ring gear 53 imparts rotation to the planetary gears 56, the planetary spider 57 and the cam shaft 58 which thus turn about the stationary shaft 16 having the sun gear 51 keyed thereon. The ratios of the gears 51, 53 and 56 are preferably so chosen that the cam shaft 58 will make nineteen revolutions for each twenty revolutions of the cylindrical shell 24. Each breaker 38 will thus advance one revolution with respect to nineteen revolutions of the cam shaft 58 and in so doing will be moved outward radially by its associated cam 61 to break the core 36. In other words, the breaker 38 will move outward against the core 36 once during each twenty revolutions of the cylindrical shell 24. Since the breakers in each tier are in pairs oppositely disposed from each other, the movement of the breakers in each tier will be for each ten revolutions of the cylindrical shell 24.

As shown with respect to Fig. 2 the cams 61 are angularly spaced on the cam shaft 58 so that an individual breaker 38 will be moving outward six times in each twenty revolutions of the cylindrical shell 24, or a breaker will move against the core every three and one-third revolutions of the shell 24.

The frames 11 which support the cutting head according to the present are a part of any suitable mechanism for moving the frames with respect to the seam face, both up and down, and with a crowding motion into the seam. The cutting action afforded by the cutter bits 31 and the cutter chains 39 is of course a function of the power expended in crowding the frames 11 against the seam and also that expended in moving the frames 11 up and down with reference to the seam.

The mechanism for driving the cutter chains 39 and 44 and the mechanism for crowding and swinging the frames 11 with respect to the seam face form no part of the present invention, and any suitable mechanism accomplishing such a purpose is contemplated for use with the cutter head according to the present invention.

Thus has been described a novel and useful cutting head for removing coal or other frangible material from a seam without the use of explosives. According to the present invention it is possible to obtain a higher percentage of lump coal than has been heretofore possible in the use of continuous miners according to the prior art. The cutter head according to the present invention also makes it possible to obtain a greater percentage of lump coal with the expenditure of little, if any, additional power.

While the invention has been described in terms of an embodiment which it may assume in practice, it is not intended that the invention be limited by the embodiment shown nor otherwise than by the terms of the appended claims.

I claim:

1. In a cutting head for a machine for mining coal from a seam, a frame defining a support for a stationary shaft, a drum mounted for rotation on said stationary shaft and movable on said stationary shaft and with said frame with respect to said seam, cutter bits mounted on the periphery of said drum for cutting spaced kerfs in said seam, breakers carried by said drum and adapted to move outward with respect to the periphery of said drum in timed relation to the rotation of said drum, to enter said kerfs and contact the sides of said kerfs to break the coal from the cores formed between said kerfs, means for imparting rotation to said drum, means for moving said breakers in timed relation to the rotation of said drum comprising an epicyclic train including a sun gear fixed to said stationary shaft, an internal ring gear mounted on said drum and rotatable therewith, a cam shaft including a spider for supporting planet gears meshing with said ring gear and said sun gear for turning said cam shaft in timed relationship to the rotation of said drum, cams mounted on said camshaft for moving said breakers outward in timed relationship with respect to said drum to break the cores formed by the cutting action of said cutter bits.

2. In a cutting head for a machine for mining coal from a seam, a frame defining a support for a stationary shaft, a drum mounted for rotation on said stationary shaft and movable on said stationary shaft and with said frame with respect to said seam, cutter bits mounted on the periphery of said drum for cutting spaced kerfs in said seam, breakers carried by said drum and adapted to move outward with respect to the periphery of said drum in timed relation to the rotation of said drum for breaking the cores formed between said kerfs, means for driving the drum comprising a chain sprocket secured to each end of said drum, cutter chains supported by said frames and engaging said chain sprockets for driving said drum and for cutting kerfs for the clearance of said frames and said drum while being advanced into said seam, means for moving said breakers in timed relation to the rotation of said drum comprising an epicyclic train including a sun gear fixed to said stationary shaft, an internal ring gear mounted on said drum and rotatable therewith, a cam shaft including a spider for supporting planet gears meshing with said ring gear and said sun gear for turning said cam shaft in timed relationship to the rotation of said drum, and cams mounted on said camshaft for moving said breakers outward in timed relationship with respect to said drum to break the cores formed by the cutting action of said cutter bits.

References Cited in the file of this patent

UNITED STATES PATENTS

| Number | Name | Date |
|---|---|---|
| 1,116,355 | Morgan | Nov. 3, 1914 |
| 2,096,917 | Pray | Oct. 26, 1937 |